US009164571B2

(12) United States Patent
Kawakami

(10) Patent No.: US 9,164,571 B2
(45) Date of Patent: Oct. 20, 2015

(54) ELECTRONIC APPARATUS AND POWER SAVING CONTROL METHOD

(71) Applicant: Kabushiki Kaisha Toshiba, Minato-ku, Tokyo (JP)

(72) Inventor: Hosui Kawakami, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 237 days.

(21) Appl. No.: 14/013,758

(22) Filed: Aug. 29, 2013

(65) Prior Publication Data

US 2014/0215249 A1    Jul. 31, 2014

Related U.S. Application Data

(63) Continuation of application No. PCT/JP2013/058387, filed on Mar. 22, 2013.

(30) Foreign Application Priority Data

Jan. 31, 2013   (JP) ................................ 2013-017769

(51) Int. Cl.
*G06F 1/32*        (2006.01)

(52) U.S. Cl.
CPC ............ *G06F 1/3256* (2013.01); *G06F 1/3215* (2013.01); *G06F 1/3228* (2013.01); *Y02B 60/125* (2013.01)

(58) Field of Classification Search
CPC .... G06F 1/3215; G06F 1/3228; G06F 1/3256
USPC ........................................................ 713/323
See application file for complete search history.

(56) References Cited

U.S. PATENT DOCUMENTS 7,929,383 B2    4/2011  Yamazaki et al.
2008/0005461 A1  1/2008  Toda et al.
(Continued)

FOREIGN PATENT DOCUMENTS

JP    2001-135009   5/2001
JP    2008-262393   10/2008
(Continued)

OTHER PUBLICATIONS

An English Translation of the International Search Report mailed by Japan Patent Office on Aug. 7, 2014 in the corresponding PCT application No. PCT/JP2013/058387 and Notification (PCT/IB/311)—3 pages.

(Continued)

*Primary Examiner* — Albert Wang
(74) *Attorney, Agent, or Firm* — Knobbe, Martens, Olson & Bear, LLP

(57) ABSTRACT

According to one embodiment, an electronic apparatus includes a first device, a first controller, and a second controller. The first controller transits the apparatus between a working state and a hibernation or stand-by state. The second controller shifts the first device from an ordinary operation mode to a power saving mode when a first condition is established while the apparatus is in the working state. The second controller shifts the first device to the power saving mode without waiting that the first condition is satisfied when the apparatus returns to the working state in which the first device is set to the ordinary operation mode after the apparatus shifted to the hibernation state or to the stand-by state in a state that the first device is in the power saving mode.

9 Claims, 7 Drawing Sheets

(56) References Cited

U.S. PATENT DOCUMENTS

| | | |
|---|---|---|
| 2010/0257390 A1* | 10/2010 | Okoge et al. ................ 713/320 |
| 2012/0229840 A1 | 9/2012 | Fukada |
| 2014/0089693 A1* | 3/2014 | Ooi ............................. 713/320 |

FOREIGN PATENT DOCUMENTS

| | | |
|---|---|---|
| JP | 2009-187606 | 8/2009 |
| JP | 2010-122875 | 6/2010 |
| JP | 2011-076641 | 4/2011 |
| JP | 2012-238166 | 5/2011 |
| JP | 2012-186752 | 9/2012 |
| WO | WO 2006/098036 | 9/2006 |
| WO | WO 2014/119008 A1 | 8/2014 |

OTHER PUBLICATIONS

International Search Report and Written Opinion for application No. PCT/JP2013/058387, dated Apr. 23, 2013.

* cited by examiner

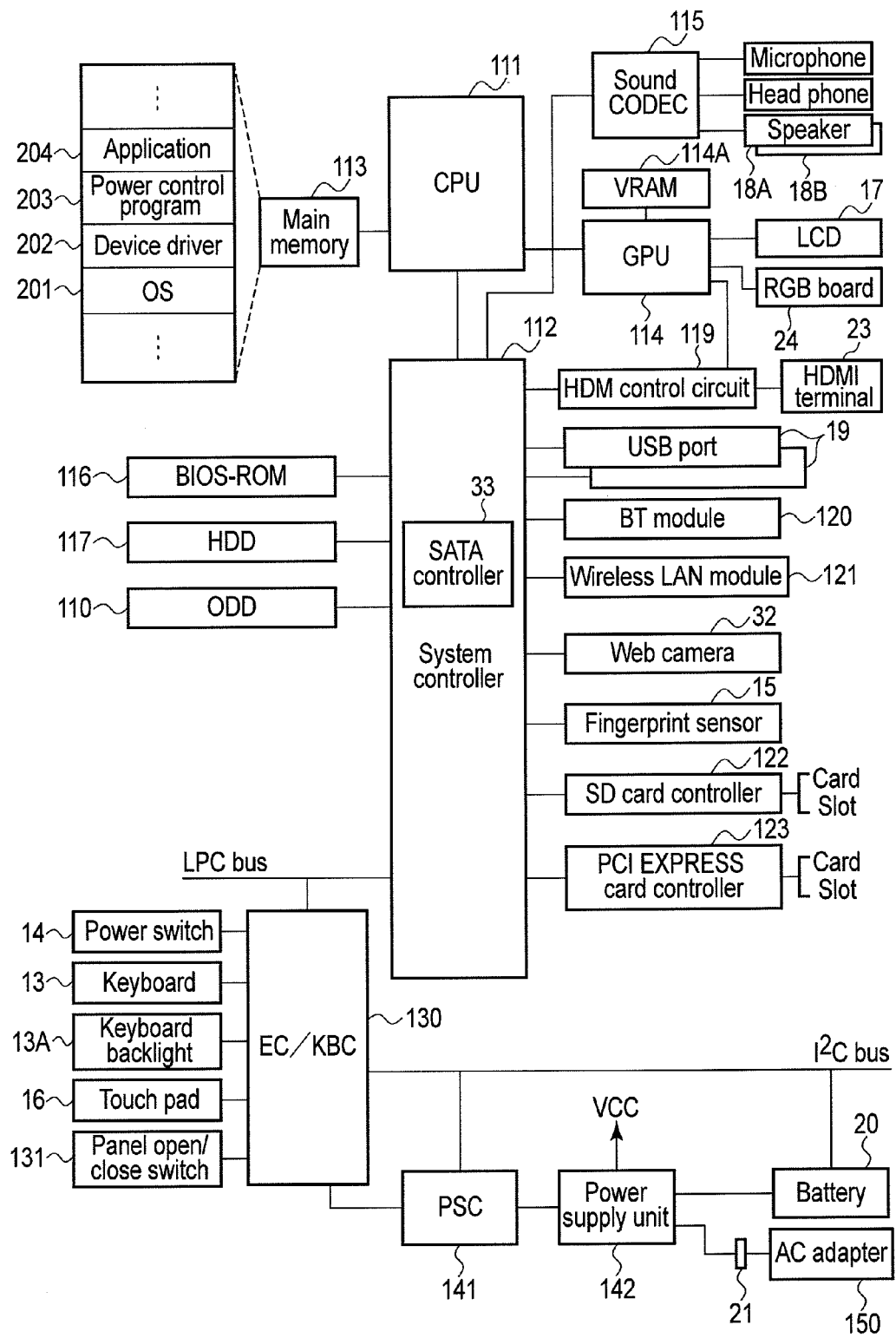
F I G. 2

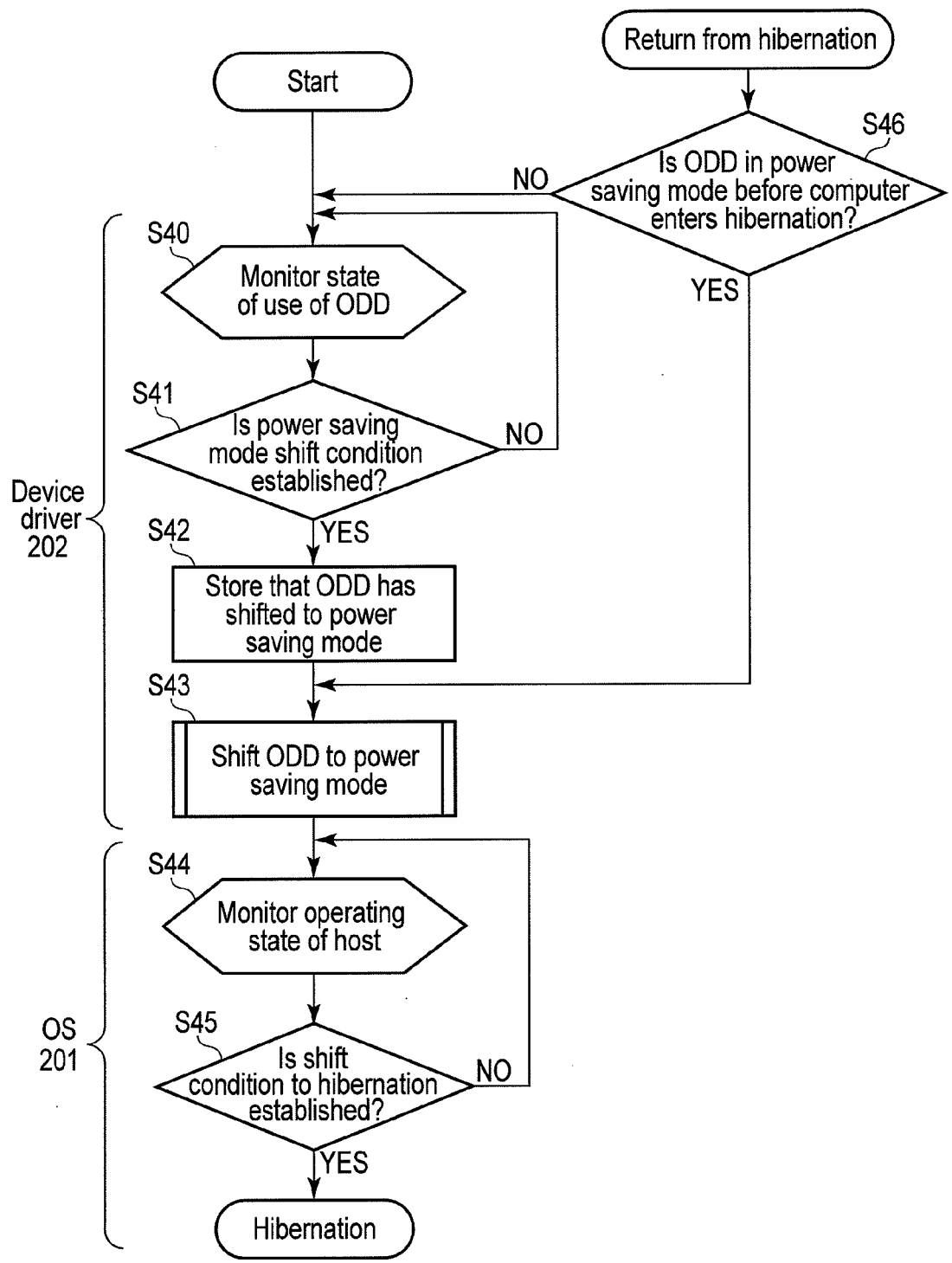
F I G. 4

ELECTRONIC APPARATUS AND POWER SAVING CONTROL METHOD

CROSS REFERENCE TO RELATED APPLICATIONS

This application is a Continuation Application of PCT Application No. PCT/JP2013/058387, filed Mar. 22, 2013 and based upon and claiming the benefit of priority from Japanese Patent Application No. 2013-017769, filed Jan. 31, 2013, the entire contents of all of which are incorporated herein by reference.

FIELD

Embodiments described herein relate generally to an electronic apparatus and a power saving control method applied to the electronic apparatus.

BACKGROUND

Recently, various types of an electronic apparatus such as a tablet computer and a notebook personal computer (PC) have been developed. Many of these types of an electronic apparatus have various power saving control functions for reducing a power consumption of the electronic apparatus. A function for shifting an electronic apparatus to a hibernation state or to a suspend state has been known as one of typical power saving control functions.

In the hibernation state, power of almost all the components in an electronic apparatus is turned off in a state that a system context is stored in a non-volatile storage. In this way, placing the electronic apparatus in the hibernation state while it is in an idling state and the like can reduce power uselessly consumed by the electronic apparatus.

In the stand-by state, power of almost all the components except a main memory is turned off. Thus, the stand-by state is also useful to reduce useless power.

Further, a recent electronic apparatus uses also a function for shifting devices in the electronic apparatus to a power saving mode.

Since power saving is required in view of recent social conditions, much of an electronic apparatus in an office and the like is operated in such a manner that a hibernation state or a stand-by state is frequently used.

However, ordinarily, when an electronic apparatus returns from the hibernation state or the stand-by state to a working state, almost all the devices in an electronic apparatus are reset to an ordinary operating state. Accordingly, the electronic device may consume a relatively large amount of power for some time after it has returned to a working state.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary view showing an exemplary system configuration of the electronic apparatus according to the embodiment.

FIG. 4 is an exemplary flowchart showing a procedure of a power saving control process carried out by the electronic apparatus according to the embodiment.

DETAILED DESCRIPTION

Various embodiments will be described hereinafter with reference to the accompanying drawings.

In general, according to one embodiment, an electronic apparatus includes a first device, a first controller, and a second controller. The first controller is configured to transit the apparatus between a working state and a hibernation or stand-by state. The second controller is configured to shift the first device from an ordinary operation mode to a power saving mode when a first condition is established while the apparatus is in the working state. The second controller is configured to shift the first device to the power saving mode without waiting that the first condition is satisfied when the apparatus returns to the working state in which the device is set to the ordinary operation mode after the apparatus shifted to the hibernation state or to the stand-by state in a state that the device is in the power saving mode.

First, referring to FIG. 1, a configuration of an electronic apparatus according to the embodiment will be explained. The electronic apparatus can be realized as various electronic apparatus such as a notebook personal computer, a tablet terminal, and the like. It is assumed below that the electronic apparatus is realized as a notebook personal computer 10.

Figure 1:
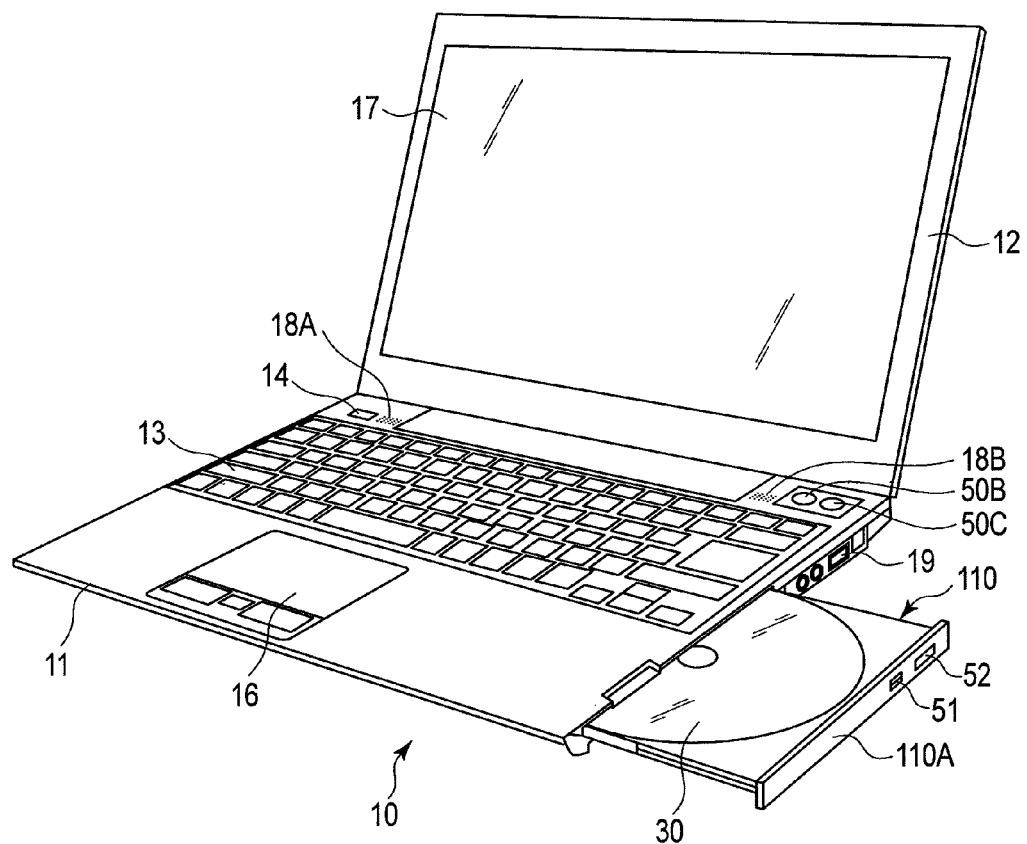
FIG. 1 is an exemplary perspective view showing an outside appearance of an electronic apparatus according to an embodiment.

FIG. 1 is a perspective view of a computer 10 with a display unit opened when it is viewed from a front surface side. The computer 10 comprises a computer main body 11 and the display unit 12. The display unit 12 is assembled with a display such as a liquid crystal display (LCD) 17.

The display unit 12 is attached to the computer main body 11 turnably between an open position at which an upper surface of the computer main body 11 is exposed and a closed position at which the upper surface thereof is covered with the display unit 12. The computer main body 11 comprises a thin box-shaped housing, wherein a keyboard 13, a touch pad 16, a power switch 14 configured to turn on and off power of the computer 10, several function buttons 50B and 50C, and speakers 18A, 18B are disposed on an upper surface of the housing. Further, a USB connector 19 configured to connect a USB is disposed on a right side surface of the computer main body 11. Further, the computer main body 11 comprises an optical disc drive (ODD) 110.

The ODD 110 is a driver configured to drive an optical disc medium. The ODD 110 comprises a tray (disc tray) 110A on which an optical disc medium 30 is detachable mounted, a spindle motor configured to rotate the optical disc medium 30, and the like. The disc tray 110A is attached to the housing of the computer main body 11 in order to move between an accommodating position at which the disc tray 110A is accommodated in the main body 11 and a projecting position at which the disc tray 110A projects to the outside.

Note that, although assumed here is a case that the ODD 110 is a tray type ODD in which the ODD 110 comprises a disc tray, the ODD 110 may be a slot-in type ODD. The ODD 110 is a CD drive capable of reading a CD or writing to the CD, a DVD drive capable of reading a DVD® or writing to the DVD, a BD drive capable of reading a BD (Blu-ray Disc®) or writing to the BD, or the like.

FIG. 2 shows a system configuration of the computer 10. The computer 10 comprises, in addition to the ODD 110, a CPU 111, a system controller 112, a main memory 113, a graphics processing unit (GPU) 114, a sound codec 115, a BIOS-ROM 116, an HDD (hard disc drive) 117, a BT (Bluetooth (Registered Trademark)) module 120, a wireless LAN module 121, an SD card controller 122, a PCI EXPRESS card controller 123, an embedded controller/keyboard controller IC (EC/KBC) 130, and the like.

The CPU 111 is a processor configured to control operations of components of the computer 10. The CPU 111 executes various software which load into the main memory 113 from the HDD 117. Further, the software comprises an operating system (OS) 201, a device driver 202, and various application programs. The application programs comprise a power control program 203 and an application program 204.

The OS 201 can transit a system state of the computer 10 between a working state and a hibernation or stand-by state in cooperation with a basic input/output system (BIOS) in the BIOS-ROM 116. The working state corresponds to a state S0 regulated by Advanced Configuration and Power Interface (ACPI) standard. The hibernation state corresponds to a state S4 regulated by ACPI standard, and the stand-by state corresponds to a state S3 regulated by ACPI standard.

When, for example, an idle state of the computer 10 has continued for a time which can be set or changed by a user, the OS 201 can shift the computer 10 to the hibernation state or to the stand-by state in cooperation with the BIOS. In the stand-by state, power of almost all the components except the main memory 113 is turned off. In the hibernation state, power of almost all the components comprising the main memory 113 is turned off in a state that the system context such as contents of the HDD 117, and the like is stored in the main memory 113.

Operating the power switch 14 while the computer 10 is in the stand-by state or in the hibernation state returns the system state of the computer 10 from the stand-by state or the hibernation state to the working state using a system context stored in the main memory 113 or a system context stored in the HDD 117. A process for returning the computer 10 from the stand-by state or the hibernation state to the working state is executed by the BIOS and the OS 201.

The device driver 202 is a driver configured to control a device in the computer 10 that is to be subjected to the power saving control. In the embodiment, the device is the ODD 110, the HDD 117, the SD card controller 122, the LCD 17, or the like. The following explanation will be made assuming a case that the device is the ODD 110. The device driver 202 can transit a state of the ODD 110 between an ordinary operation mode and a power saving mode in which the ODD 110 consumes power smaller than that in the ordinary operation mode. The ordinary operation mode corresponds to a state D0 regulated by ACPI standard, and the power saving mode corresponds to a state D3 regulated by ACPI standard.

When a predetermined condition for shifting the ODD 110 to the power saving mode is satisfied while the system state of the computer 10 is in the working state, the device driver 202 shifts the ODD 110 to the power saving mode. The predetermined condition for shifting the ODD 110 to the power saving mode comprises, for example, not to issue an access request to the ODD 110 for a predetermined period, and the like. Further, when an event for returning the ODD 110 to the ordinary operation mode is generated while the ODD 110 is in the power saving mode, the device driver 202 returns the ODD 110 to the ordinary operation mode. The event for returning the ODD 110 to the ordinary operation mode comprises to press a function button, to press an eject button 52 of the ODD 110, and the like.

When the computer 10 returns from the hibernation state or the stand-by state to the working state, almost all the devices in the computer 10 are reset to the ordinary operation mode (D0).

Accordingly, ordinarily, in a state that the ODD 110 has been set to the power saving mode, the computer 10 (host) shifts to the hibernation state or to the stand-by state and when computer returns to the working state, the ODD 110 is reset to the ordinary operation mode. For this reason, even if the ODD 110 is not used, for a while after the computer 10 (host) has returned to the working state, that is, during a period until the predetermined condition for shifting the ODD 110 to the power saving mode is established again after the computer 10 has returned to the working state, the ODD 110 is kept to the ordinary operation mode. Thus, there is a risk that power is uselessly consumed by the ODD 110.

To cope with the problem, in the embodiment, the device driver 202 has a function for instantly shifting the ODD 110 to the power saving mode without waiting that the predetermined condition for shifting the ODD 110 to the power saving mode when the computer 10 returns to the working state after the computer 10 has shifted to the hibernation state or to the stand-by state in a state that the ODD 110 is in the power saving mode. As a result, since the period in which the ODD 110 is kept in the ordinary operation mode can be minimized, the power consumption of the computer 10 can be reduced.

The host is a generic term of a parts group or some parts of the group except the ODD 110 disposed to the computer 10. The host is composed of, for example, the CPU 111, the system controller 112, the main memory 113, and the like. The host transits the computer 10 to plural states such as the working state, the stand-by state, or the hibernation state in accordance with ACPI standard.

The device driver 202 carries out a power management of the ODD 110 and the like in cooperation with the power control program 203. This will be explained in detail referring to FIG. 4. The CPU 111 executes also the basic input/output system (BIOS) in the BIOS-ROM 116 as a non-volatile memory. The BIOS is a system program for controlling hardware.

The GPU 114 is a display controller configured to control the LCD 17 used as a display monitor of the computer 10. The GPU 114 creates a video signal to be supplied the LCD 17 from display data in a video memory (VRAM) 114A.

The system controller 112 is a bridge device configured to connect between the CPU 111 and the respective components. The system controller 112 is built in with a serial ATA controller (SATA controller) 33 configured to control the ODD 110 and the HDD 117. The system controller 112 communicates with respective devices on an LPC (Low PIN Count) bus.

An EC/KBC 130 is a power managing controller configured to manage the power of the computer 10 and realized as a one chip microcomputer built in with a keyboard controller configured to control, for example, the keyboard (KB) 13, the touch pad 16, and the like. The EC/KBC 130 has a function for turning on and off the power of the computer 10 in accordance with an operation of the power switch 14 by the user.

Figure 3:
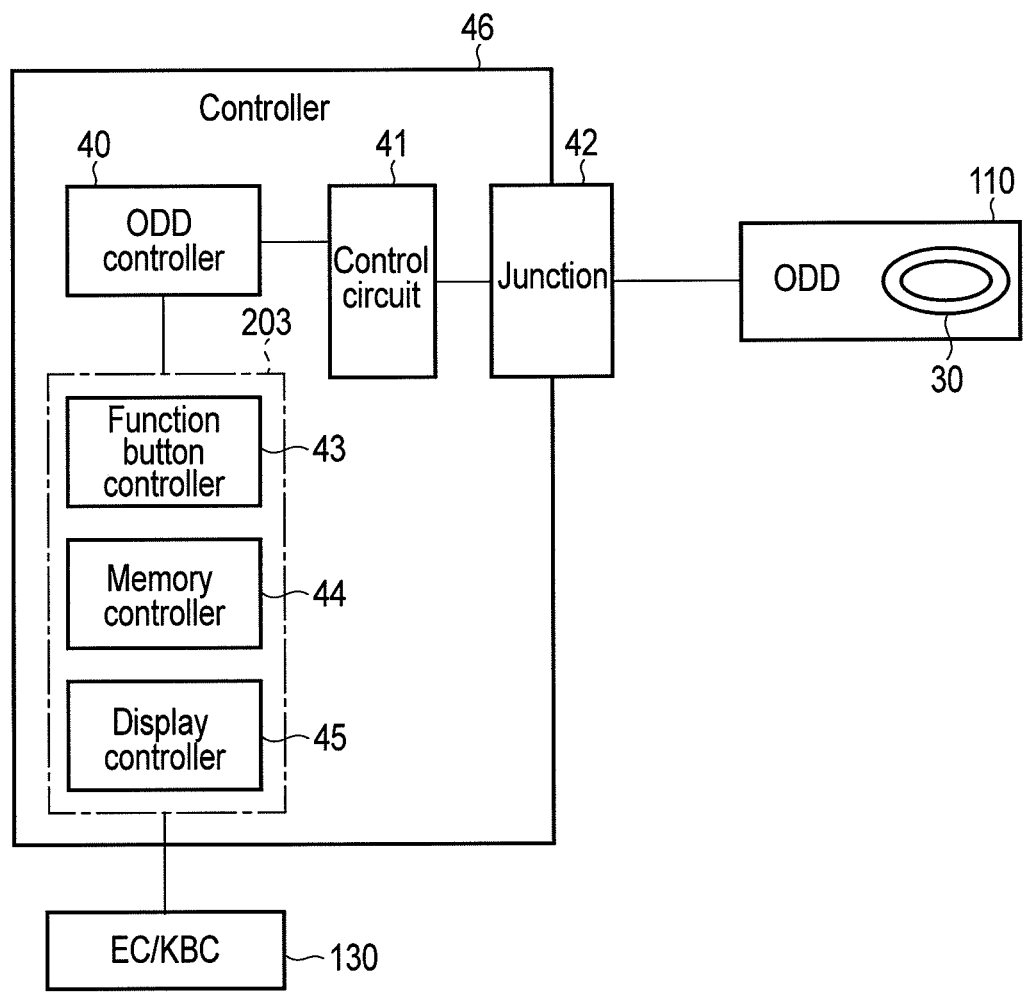
FIG. 3 is an exemplary view showing an exemplary system configuration for controlling devices disposed to the electronic apparatus according to the embodiment.

Next, referring to FIG. 3, a relation between the ODD 110 and the host will be explained. A controller 46 is realized by an ODD controller 40, a control circuit 41, the power control program 203, and the like. The ODD controller 40 is composed of the device driver 202, the SATA controller 33, and the like. The controller 46 is connected to the ODD 110 via a junction 42. The controller 46 is connected also to the EC/KBC 130. Note that the junction 42 is an interface capable of connecting the ODD 110 and, for example, a SATA interface.

The controller 46 is configured to control driving of the ODD 110. The controller 46 has a power saving control function for shifting the ODD 110 to the power saving mode.

The ODD controller 40 controls the control circuit 41. The control circuit 41 controls the ODD 110. The power control program 203 transmits button information to, for example, the controller 46 or the ODD controller 40. The button information shows that a predetermined function button is pressed. The predetermined function button is the button 50B, the button 50C, or the like.

The power saving control function eliminates a useless power consumption in the control circuit 41 or in the ODD 110. The power saving control comprises, for example, the following two functions.

A first power saving control function is a function for shifting the control circuit 41 and the ODD 110 to the power saving mode when a state that an access request such as a request for reading, writing, and the like from the host to the ODD 110 has continued for a predetermined period and it is determined that the ODD 110 is not used, that is, when only polling of a state of the ODD 110 has continued and the medium 30 is not set to the ODD 110 or is not used even if it is set thereto.

When the first power saving control function is used, the ODD controller 40 can secure an operability by the user by confirming that no access request is issued from the host to the ODD 110 and providing a predetermined period until the ODD 110 is shifted to the power saving mode. While the ODD 110 is in the power saving mode, the ODD controller 40 displays that the ODD 110 is in the power saving mode. The ODD controller 40 can notify the user that the ODD 110 is in the power saving mode by, for example, turning on or blinking a lamp 51 and the like or by displaying an icon and the like showing that the ODD 110 is in the power saving mode on the LCD 17 and the like.

A second power saving control function is a function for causing the ODD controller 40 to shift the control circuit 41 or the ODD 110 from the power saving mode to the ordinary operation mode when an operation such as a depression of a predetermined function button, and the like is carried out.

When the second power saving control function is used, the ODD controller 40 can shift the control circuit 41 and the ODD 110 from the power saving mode to the ordinary operation mode when, for example, a function button such as a playback button for reading the medium 30, and the like or other predetermined function button is pressed. When a button, for example, the eject button 52 and the like disposed to the ODD 110 is pressed, an event signal is sent from the ODD 110 to the controller 46. In response to the event signal, the ODD controller 40 can shift the control circuit 41 and the ODD 110 from the power saving mode to the ordinary operation mode.

The power control program 203 comprises a function button controller 43, a memory controller 44, and a display controller 45. The power control program 203 carries out various controls in cooperation with the device driver 202.

The function button controller 43 instructs the ODD controller 40 to shift the ODD 110 in the power saving mode to the ordinary operation mode based on a signal showing that a predetermined function button supplied from the EC/KBC 130 has been operated.

The memory controller 44 carries out a control for storing information showing that the ODD 110 is in any of the ordinary operation mode or the power saving mode. For example, when the ODD 110 shifts to the power saving mode or when the ODD 110 in the power saving mode shifts to the stand-by state or the hibernation state, the memory controller 44 carries out a control for storing information showing that the ODD 110 is in the power saving mode in the main memory 113 or in context data in the hibernation state under a control of the device driver 202. Note that, the following explanation will be made exemplifying a case that the hibernation state is used as a sleep state of the computer 10.

The display controller 45 displays that the ODD 110 is in the power saving mode under the control of the device driver 202 while the ODD 110 is in the power saving mode (by turning on or blinking the lamp 51, displaying an icon, and the like).

Next, a procedure of a power saving control process of the embodiment will be explained referring to FIG. 4.

First, starting up the computer 10 also executes the device driver 202. The device driver 202 monitors a state of use of the ODD 110 (step S40). For example, the device driver 202 monitors a state of an access request to the ODD 110. The access request is a request different from the polling, for example, a request of writing to or reading from the ODD 110, and the like. Otherwise, the access request is a request for fetching the medium 30 from the ODD 110, and the like. Next, the device driver 202 determines whether a shift condition of the ODD 110 to the power saving mode is established based on a monitoring result of an access state (step S41). Although the shift condition will be described later in detail referring to FIG. 6 and FIG. 7, as the shift condition, for example, a condition that no access request is issued to the ODD 110 for a predetermined period may be used. Otherwise, when the condition that no access request is issued to the ODD 110 for the predetermined period and the condition that the medium 30 is not set to the ODD 110 or is not used even if it is set thereto are established, it may be determined that the shift condition is established. When the shift condition to the power saving mode is not established (step S41: NO), the device driver 202 monitors again the state of use of the ODD 110. When the shift condition to the power saving mode is established (step S41: YES), the device driver 202 instructs the memory controller 44 to store information showing that the ODD 110 has shifted to the power saving mode (step S42). In this way, storing the information showing that the ODD 110 has shifted to the power saving mode allows to determine whether or not a state of the ODD 110 just before the computer 10 returns from the hibernation state has been the power saving mode based on the information when the computer 10 was returned from the hibernation state.

Next, the device driver 202 shifts the ODD 110 from the ordinary operation mode in which the ODD 110 is in an idle state to the power saving mode (step S43). While the ODD 110 is in the power saving mode, the device driver 202 cuts off a direct access to the ODD 110. Cutting-off the direct access to the ODD 110 means, for example, to cut off the direct access in response to the access request, for example, from the OS 201 to the ODD 110 by the device driver 202 and the device driver 202 makes a response to the direct access to the OS 202. Further, when the ODD 110 comprises a first power saving mode and a second power saving mode which has a power consumption smaller than the first power saving mode and a shift condition to a power saving mode is established, first, the device driver 202 may shift the ODD 110 to the first power saving mode, and when a different predetermined condition is established, the device driver 202 may shift the ODD 110 to the second power saving mode. In this way, the ODD 110 sequentially shifts to a smaller power consumption mode. Further, instead of shifting a device such as the ODD 110 to the power saving mode just after the computer 10 has returned to the working state, a time until the ODD 110 is shifted to the power saving mode after the computer 10 has returned to the working state may be shorter than a wait time corresponding to the power saving mode shift condition after the computer 10 has returned to the working state.

Next, the OS 201 monitors an operating state of the host (step S44). The operating state of the host is a state showing whether or not the computer 10 is used. The OS 201 determines a transition condition for transiting the computer 10 to the hibernation state is established, that is, whether the idle state of the computer 10 has continued for a predetermined period (step S45). When the transition condition is not established (step S45: NO), the OS 201 monitors again the operating state of the host. When the transition condition is established (step S45: YES), the OS 201 transits the computer 10 to the hibernation state.

The power saving control process until the computer 10 transits from the working state to the hibernation state after the ODD 110 has shifted to the power saving mode has been explained referring to FIG. 4. Next, the power saving control process when the computer 10 having further transited to the hibernation state thereafter returns to the working state thereafter will be explained.

When the computer 10 has returned to the working state, the power saving mode of the ODD 110 is cancelled and the ODD 110 is set from the power saving mode to the ordinary operation mode by the OS 201 and the like. When, for example, the computer 10 returns to the working state, since the BIOS and the OS 201 need to recognize the ODD 110, and the like, it is necessary to reset the ODD 110 to the ordinary operation mode.

When the computer 10 shifts to the hibernation state in a predetermined condition (transition condition) and thereafter returns from the hibernation state, the device driver 202 or the controller 46 determines whether or not the ODD 110 has shifted to the power saving mode before the computer 10 enters the hibernation state (step S46). When the ODD 110 has been in the power saving mode before the computer 10 enters the hibernation state (step S46: YES), the device driver 202 or the controller 46 shifts the ODD 110 to the power saving mode at once by omitting to monitor an access state of the ODD 110, that is, without waiting that the above shift condition is satisfied. When the ODD 110 has not been in the power saving mode before the computer 10 enters the hibernation state (step S46: NO) the device driver 202 or the controller 46 goes to step S40 and carries out a monitoring process of the state of use of the ODD 110 to determines whether or not the above shift condition is satisfied.

Figure 5:
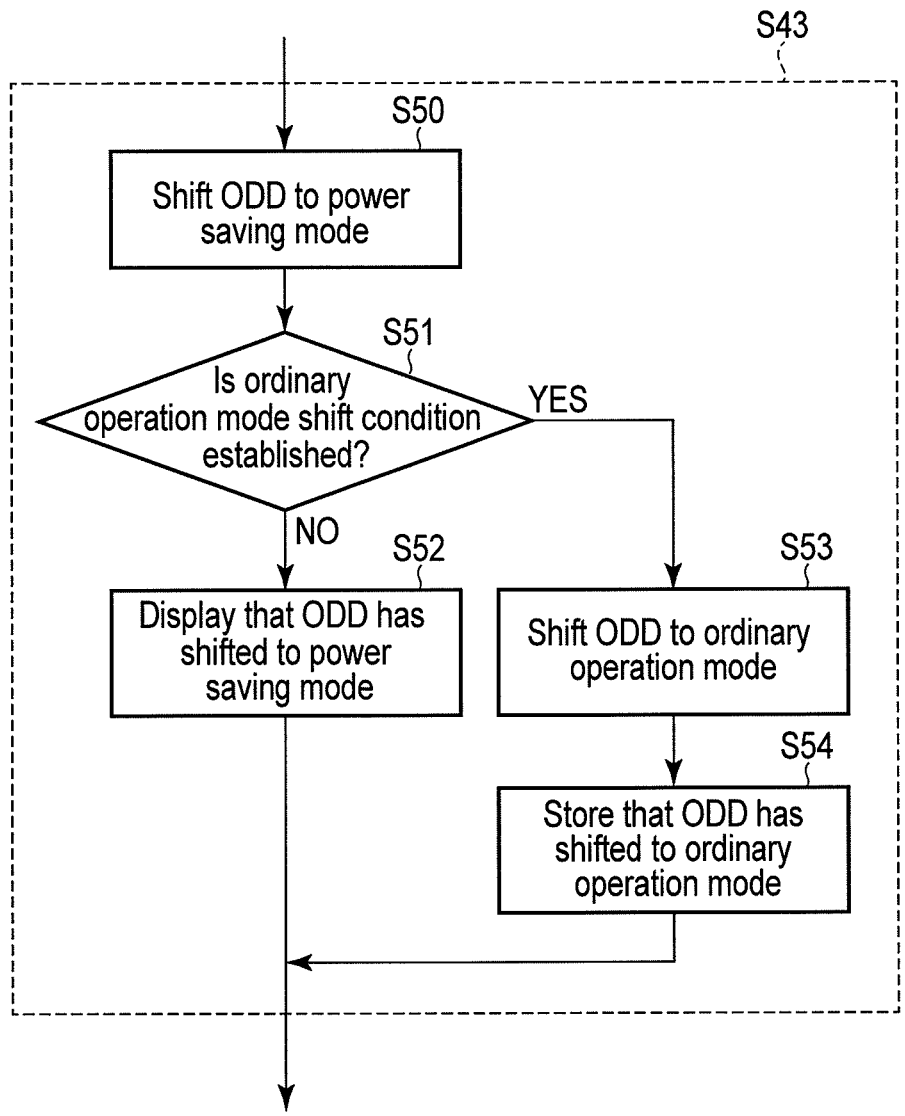
FIG. 5 is an exemplary flowchart showing a procedure of a device state control process carried out by the electronic apparatus according to the embodiment in the power saving control process of FIG. 4.

Next, a procedure of a process at step S43 of FIG. 4 will be explained referring to a flowchart of FIG. 5. When an ordinary operation mode shift condition is satisfied after the ODD 110 has shifted to the power saving mode, the device driver 202 shifts the ODD 110 to the ordinary operation mode. This will be specifically explained referring to FIG. 5.

The device driver 202 shifts the ODD 110 to the power saving mode (step S50). Next, the device driver 202 determines whether or not the ordinary operation mode shift condition (return condition) is satisfied. (step S51). When the ordinary operation mode shift condition is not (step S51: NO), that is, while the ODD 110 is in the power saving mode, the device driver 202 makes a display so that the user can recognize that the ODD 110 is in the power saving mode (step S52). When the ordinary operation mode shift condition is satisfied (step S51: YES), the device driver 202 returns the ODD 110 from the power saving mode to the ordinary operation mode (step S53). Next, the device driver 202 stores information showing that the ODD 110 is returned from the power saving mode to the ordinary operation mode (step S54). After the process at step S52 or the process at step S54 has been finished, the process goes to step S44.

A case that the computer 10 transits to the hibernation state after the process at step S54, and then the computer 10 returns from the hibernation state to the working state will be explained. Before the computer 10 transits to the hibernation state, it is stored that the ODD 110 is in the ordinary operation mode. Based on the stored information, at step S46, it is determined that the ODD 110 has been in the ordinary operation mode before the computer 10 transits to the hibernation state. In the case, a process for determining whether or not the shift condition to the power saving mode is satisfied is carried out without shifting the ODD 110 to the power saving mode at once.

Figure 6:
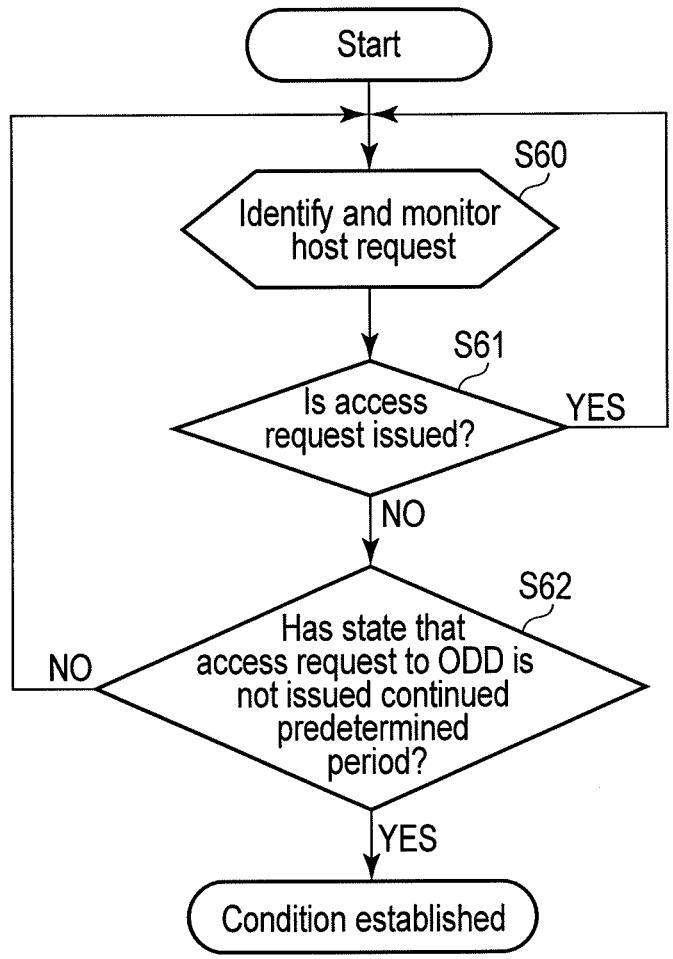
FIG. 6 is an exemplary flowchart showing procedures of a host-requested identifying process and monitoring process in the electronic apparatus according to the embodiment.

Next, a procedure of the identifying process and the monitoring process requested by the host will be explained referring to FIG. 6. The processing procedure of FIG. 6 shows a processing procedure for determining whether or not the shift condition of the ODD 110 to the power saving mode (first shift condition) is satisfied in the process at step S41 of FIG. 4. In more detail, the processing procedure shown in FIG. 6 shows a processing procedure for determining whether or not an access request such as a request for reading, writing, or the like to the ODD 110 from the host has continued for a predetermined period.

The device driver 202 identifies and monitors the access request from the host to the ODD 110 such as the request for reading, writing, or the like (step S60). Next, the device driver 202 determines whether or not the access request is issued from the OS 201, the application program 204 or the like to the ODD 110 (step S61). Note that the application program 204 is an application program capable of issuing the access request to the ODD 110 via, for example, the OS 201. Specifically, the application program 204 is a data recording/playing application program and the like for writing data to the optical disc medium 30 and reading data from the optical disc medium 30. When the access request is issued to the ODD 110 (step S61: YES), the device driver 202 identifies and monitors the access request to the ODD 110 from the host again. When the access request to the ODD 110 is not issued (step S61: NO), the device driver 202 determines whether or not a state in which the access request to the ODD 110 is not issued has continued for a predetermined period (step S62). When the access request to the ODD 110 is issued in the predetermined period, the device driver 202 returns to step S60 and identifies and monitors the access request from the host to the ODD 110 again. When the access request to the ODD 110 has not been issued for the predetermined period, the device driver 202 determines that the shift condition is established and the ODD 110 is not used, that is, only a polling as to a state of the ODD 110 is continued. In this way, the first shift condition is established by the processing procedure shown in FIG. 6.

Figure 7:
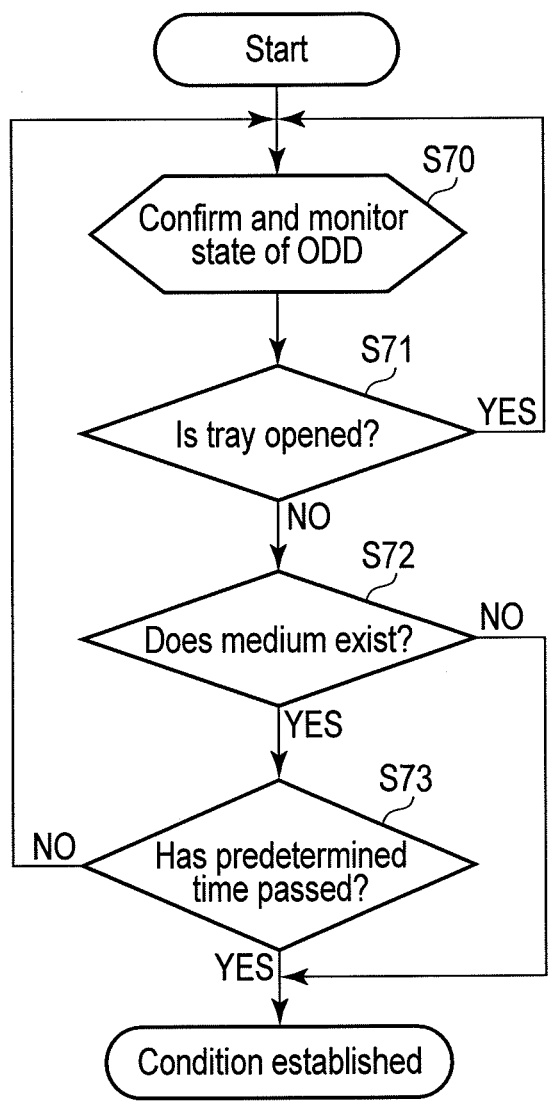
FIG. 7 is an exemplary flowchart showing a state confirmation process and a monitoring process of a device carried out by the electronic apparatus according to the embodiment.

Next, a processing procedure for confirming and monitoring the state of the ODD 110 will be explained referring to FIG. 7. The processing procedure of FIG. 7 shows a processing procedure for determining whether or not a shift condition of the ODD 110 to a power saving mode (second shift condition) is satisfied in the process of step S41 of FIG. 4.

The device driver 202 confirms and monitors the state of the ODD 110 (step S70). The state of the ODD 110 is a state of the ODD 110 as a basis for determining whether the ODD 110 is used. The device driver 202 determines whether or the disc tray 110A opens or closes (step S71). When the disc tray 110A opens (step S71: YES), the device driver 202 confirms and monitors the state of the ODD 110 again. When the disc tray 110A closes (step S71: NO), the device driver 202 determines that the ODD 110 is used. Note that the ODD 110 is used means, for example, that there is a possibility that the user carries out some operation using the ODD 110.

Next, when the disc tray 110A closes, the device driver 202 determines whether or not the medium 30 is set to the ODD 110 (step S72). When the medium 30 is not set to the ODD 110 (step S72: NO), the device driver 202 determines that the ODD 110 is not used and the second shift condition is established. When the medium 30 is set to the ODD 110 (step S72: YES), the device driver 202 determines whether or not at least a predetermined period has passed after setting the medium 30 to the ODD 110, whether or not at least a predetermined period has passed after setting the ODD 110 to the ordinary operation mode, or whether or not at least a predetermined period has passed after recognizing setting of the medium 30 to the ODD 110 by the device driver 202 or the host (step S73). Note that the process at step S73 is a process for determining whether or not, for example, the state that the disc tray 110A closes and the medium 30 is set to the ODD 110 has continued for at least a predetermined period. When at least the predetermined period has not passed, for example, when the disc tray opens in a period shorter than the predetermined period (step S73: NO), the second shift condition is not established and the device driver 202 confirms and monitors the state of the ODD 110 again. When at least the predetermined period has passed (step S73: YES), the second shift condition is established. That is, even if the medium 30 is set to the ODD 110, when at least the predetermined time has passed without using the ODD 110, it is determined that a possibility that the ODD 110 is used is low.

Next, a standard power consumption when the ODD 110 is in the ordinary operation mode (idle state) and in the power saving mode will be described. The power consumption when the ODD 110 is in the idle state is 100 mA, whereas the power consumption when the ODD 110 is in the power saving mode is 30 mA. Accordingly, when a case that the ODD 110 is shifted to the power saving mode just after the return of the computer 10 to the working state is compared with a case that the ODD 110 is shifted to the power saving mode after a wait time corresponding to the power saving mode shift condition has passed after the return of the computer 10 to the working state, the power consumption can be reduced by a power amount based on a function of a product of 70 mA that is a difference between the power consumptions of both the cases and the wait time. As to the power consumption mode, when the computer 10 has a function (circuit) for causing, for example, the control circuit 41 to be able to reduce power consumed by the ODD 110 up to 0 mA, since a difference between the power consumption in the idle state and the power consumption the power saving mode becomes 100 mA, the power consumption can be more reduced.

In the above explanation, although the case that the device is the ODD 110 has been described, the device may not be the ODD 110. For example, the device may be the HDD 117 comprising a magnetic disc. In the case, as to the second shift condition as explained referring to FIG. 7, when, for example, the HDD 117 has not been used for a predetermined period without carrying out the processes at step S71 and step S72, it may be determined that the second shift condition is established. As a still other example, the device may be an SD card read writer connected to the SD card controller 122. In the case, the medium 30 corresponds to the SD card. When SD card has been mounted on the SD card read writer for a predetermined period and an access request such as a write request to and a read request from the SD card read writer is not issued, the device driver 202 determines that the SD card read writer is not used and shifts the SD card read writer to the power saving mode.

As a still other example, the device may be the LCD 17 (panel). In the case, the device driver 202 determines whether or not a predetermined condition for shifting the LCD 17 to the power saving mode is established, for example, determines whether or not a state that a request for updating a display of the panel is not issued has continued for a predetermined period. As this state, the device driver 202 determines, for example, whether or not the idle state of the computer 10 has continued for a predetermined period, whether or not a state that an input is not issued from an input device has continued for a predetermined period, and the like. When the predetermined condition for shifting the LCD 17 to the power saving mode is established, the device driver 202 shifts the LCD 17 to the power saving mode in which power consumption of the LCD 17 can be reduced by suppressing brightness thereof. Note that, when the device is the panel, the above access request comprises a request for updating a display of the panel. Further, when the device is the panel, a display of a screen of the panel becomes dim at once by shifting the panel to the power saving mode at once just after the computer 10 has returned to the working state even if the computer 10 is not in the idle state. To cope with the problem, in the case, it is sufficient, instead of shifting the panel to the power saving mode at once after the computer 10 has returned to the working state, to make a time until the panel is shifted to the power saving mode after the computer 10 has returned to the working state shorter than a wait time corresponding to the shift condition for shifting the panel to the power saving mode.

Further, the power saving mode may be different in each type of the device. Accordingly, when the devices satisfy the shift condition to the power saving mode, the device driver 202 can also shift each of the devices to a mode in which a power consumption is more reduced.

Further, in the embodiment, although a device such as the ODD 110 is shifted to the power saving mode just after the computer 10 has returned to the working state, it is sufficient to shift the device such as the ODD 110 to the power saving mode at timing before the wait time corresponding to the power saving mode shift condition after the computer 10 has returned to the working state passes.

As described above, in the embodiment, when the shift condition is satisfied while the computer 10 is in the working state, the device (ODD 110) is shifted from the ordinary operation mode to the power saving mode. When the computer 10 shifts to the hibernation state or to the stand-by state in a state that a device is in the power saving mode and the computer 10 returns to the working state in which the device is set (reset) to the ordinary operation mode, the device is shifted to the power saving mode without waiting that the shift condition is satisfied. Accordingly, when the device has been in the power saving state before it enters the hibernation state or the stand-by state at the time the computer 10 returns from the hibernation state or the stand-by state, the computer 10 mounted with the power saving control system of the embodiment allows to reduce a power consumption until the device is shifted to the power saving state again by returning the computer 10 having been returned to the power saving state at once after it has returned from the hibernation state or the stand-by state. In view of the social conditions in which power saving (energy saving) is required, since a peak shift function is ordinarily mounted on the electronic apparatus and operated, the number of times of transition of the electronic apparatus to the hibernation state or to the stand-by state increases. Thus, a reduction of power consumed by the device at the time the electronic apparatus returns from the hibernation state or the stand-by state can more save energy.

Further, the function of the power control program 203 explained in the embodiment may be realized by hardware such as a dedicated LSI or DSP or a microcomputer.

Note that since the procedure of the power saving control process of the embodiment can be entirely executed by software, the same effect as the embodiment can be easily realized only by executing a computer program for executing the procedure of the power saving control process, the computer program being installed on an ordinary computer via a storage medium in which the computer program is stored and which can be read by the computer.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first device;
a first controller configured to transit the apparatus between a working state and a hibernation or stand-by state; and
a second controller configured to shift the first device from an ordinary operation mode to a power saving mode when a first condition is established while the apparatus is in the working state, wherein the second controller is configured to shift the first device to the power saving mode without waiting that the first condition is satisfied when the apparatus returns to the working state in which the first device is set to the ordinary operation mode after the apparatus shifted to the hibernation state or to the stand-by state in a state that the first device is in the power saving mode.

2. The apparatus of claim 1, wherein
the first condition comprises a condition that an access request to the first device is not issued for a predetermined period, and
the second controller is configured to shift the first device to the power saving mode before the predetermined period passes after the apparatus returned to the working state.

3. The apparatus of claim 1, wherein
the second controller is configured to store information showing whether the first device is in the power saving mode, and
the second controller is configured to determine, based on the stored information, whether a state of the first device just before the apparatus shifts to the hibernation or stand-by state is the power saving mode when the apparatus returned from the hibernation or stand-by state to the working state.

4. The apparatus of claim 1, wherein the first device is an optical disc drive capable of driving an optical disc.

5. The apparatus of claim 4, wherein the first condition comprises a condition that an access request to the optical disc drive is not issued for a predetermined period.

6. The apparatus of claim 1, wherein the second controller is configured to return the first device to the ordinary operation mode when a predetermined event for returning the first device to the ordinary operation mode is generated while the first device is in the power saving mode.

7. The apparatus of claim 1, wherein the second controller is configured to display that the first device is in the power saving mode while the first device is in the power saving mode.

8. A power saving control method comprising:
shifting a first device in an electronic apparatus from an ordinary operation mode to a power saving mode when a first condition is established while the electronic apparatus is in a working state; and
shifting the first device to the power saving mode without waiting that the first condition is satisfied when the apparatus returns to the working state in which the first device is set to the ordinary operation mode after the apparatus shifted to a hibernation or stand-by state in a state that the first device is in the power saving mode.

9. A computer-readable, non-transitory storage medium having stored thereon a computer program which is executable by a computer, the computer program controlling the computer to execute functions of:
shifting a first device in an electronic apparatus from an ordinary operation mode to a power saving mode when a first condition is established while the electronic apparatus is in a working state; and
shifting the first device to the power saving mode without waiting that the first condition is satisfied when the apparatus returns to the working state in which the first device is set to the ordinary operation mode after the apparatus shifted to a hibernation or stand-by state in a state that the first device is in the power saving mode.

* * * * *